United States Patent
Michie, Jr. et al.

(10) Patent No.: US 9,492,963 B2
(45) Date of Patent: Nov. 15, 2016

(54) PROCESS FOR MAKING TAILORED POLYETHEYLENE RESINS FOR SHEETS

(75) Inventors: William J. Michie, Jr., Missouri City, TX (US); Todd A. Hogan, Sanford, MI (US); Felipe Martinez Barreneche, Houston, TX (US); Anthony C. Neubauer, Piscataway, NJ (US); Stephane Costeux, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 1532 days.

(21) Appl. No.: 12/282,223

(22) PCT Filed: Mar. 9, 2007

(86) PCT No.: PCT/US2007/006143
§ 371 (c)(1),
(2), (4) Date: Jan. 10, 2012

(87) PCT Pub. No.: WO2007/106417
PCT Pub. Date: Sep. 20, 2007

(65) Prior Publication Data
US 2012/0100357 A1      Apr. 26, 2012

Related U.S. Application Data

(60) Provisional application No. 60/780,969, filed on Mar. 10, 2006.

(51) Int. Cl.
*B29C 47/08*      (2006.01)
*B29C 47/00*      (2006.01)
(Continued)

(52) U.S. Cl.
CPC ....... *B29C 47/0869* (2013.01); *B29C 47/0004* (2013.01); *B29C 47/1072* (2013.01); *B29C 47/92* (2013.01); *C08J 5/18* (2013.01); *B29C 2947/922* (2013.01); *B29C 2947/92266* (2013.01); *B29C 2947/92485* (2013.01);
(Continued)

(58) Field of Classification Search
None
See application file for complete search history.

(56) References Cited

U.S. PATENT DOCUMENTS 4,714,716 A      12/1987   Park
4,935,164 A       6/1990   Wessling et al.
(Continued)

FOREIGN PATENT DOCUMENTS

EP        085523 A2     8/1983
EP        0870803 A1   10/1998
(Continued)

OTHER PUBLICATIONS

PCT/US2007/006143, International Search Report.
(Continued)

*Primary Examiner* — Benjamin Schiffman

(57) ABSTRACT

This invention relates to coupling of polyethylene resins, more specifically coupling of polyethylene resins for use in extruded profiles, especially extruded profiles for sheet extrusion and cut sheet thermoforming applications and geomembranes. The process involves conveying a HDPE resin through an extruder, wherein the extruder comprises a feed zone, a first melt zone downstream of the feed zone, a second melt zone downstream of the first melt zone, and a third melt zone downstream of the second melt zone. The resin is melted in the first zone, contacted with oxygen in the second melt zone, and contacted antioxidant in the third melt zone.

30 Claims, 6 Drawing Sheets

(51) Int. Cl.
*B29C 47/10* (2006.01)
*C08J 5/18* (2006.01)
*B29C 47/92* (2006.01)
*B29K 23/00* (2006.01)

(52) U.S. Cl.
CPC ............... *B29C2947/92761* (2013.01); *B29C 2947/92933* (2013.01); *B29K 2023/065* (2013.01); *C08J 2323/08* (2013.01)

(56) References Cited

U.S. PATENT DOCUMENTS

| | | | |
|---|---|---|---|
| 5,342,887 | A | 8/1994 | Bergstrom et al. |
| 5,728,355 | A | 3/1998 | Asada |
| 5,739,266 | A | 4/1998 | Piana |
| 5,869,591 | A | 2/1999 | McKay et al. |
| 5,977,271 | A | 11/1999 | McKay et al. |
| 6,147,167 | A | 11/2000 | Mack et al. |
| 6,211,302 | B1 | 4/2001 | Ho et al. |
| 6,248,840 | B1 | 6/2001 | Sukhadia et al. |
| 6,325,956 | B2 | 12/2001 | Chaudhary et al. |
| 6,376,623 | B1 | 4/2002 | Hoenig et al. |
| 6,433,103 | B1 | 8/2002 | Guenther et al. |
| 6,454,976 | B1 | 9/2002 | Neubauer |
| 6,458,911 | B1 | 10/2002 | Ong et al. |
| 6,485,662 | B1 | 11/2002 | Neubauer et al. |
| 6,506,848 | B2 | 1/2003 | Hoenig et al. |
| 6,767,931 | B2 | 7/2004 | Martinez et al. |
| 6,776,924 | B2 | 8/2004 | Walters et al. |
| 6,878,454 | B1 | 4/2005 | Shannon et al. |
| 2004/0039131 | A1 | 2/2004 | Wagner et al. |
| 2004/0154168 | A1 | 8/2004 | McDonald |
| 2005/0012234 | A1 | 1/2005 | Kindig et al. |
| 2005/0012235 | A1 | 1/2005 | Schregenberger et al. |
| 2005/0038200 | A1 | 2/2005 | Borve et al. |
| 2005/0119426 | A1 | 6/2005 | Roger et al. |

FOREIGN PATENT DOCUMENTS

| | | |
|---|---|---|
| EP | 1408055 A1 | 4/2004 |
| WO | 00/52091 A1 | 9/2000 |
| WO | 00/78861 A1 | 12/2000 |
| WO | 01/66632 A1 | 9/2001 |
| WO | 2004/101674 A1 | 11/2004 |
| WO | 2005/007729 A1 | 1/2005 |
| WO | 2007/106417 A1 | 9/2007 |

OTHER PUBLICATIONS

PCT/US2007/006143, International Preliminary Report on Patentability.
PCT/US2007/006143, Written Opinion of the International Searching Authority.

PROCESS FOR MAKING TAILORED POLYETHEYLENE RESINS FOR SHEETS

REFERENCE TO PRIOR APPLICATION

This application claims the benefit of U.S. Provisional Application No. 60/780,969, filed on Mar. 10, 2006, incorporated herein by reference.

FIELD OF INVENTION

This invention relates to coupling of polyethylene resins, more specifically coupling of polyethylene resins for use in extruded profiles, especially extruded profiles for sheet extrusion and cut sheet thermoforming applications and geomembranes.

BACKGROUND AND SUMMARY OF INVENTION

High density polyethylene (HDPE) is used in sheet extrusion/thermoforming operations to produce a large variety of large parts such as truck bed liners, "port-a-potties" or portable toilets, and "dunnage trays" for holding and transporting large industrial parts such as transmissions, etc. The intended use of such products dictate that the fabricated part or container meet certain minimum requirements, such as stiffness, impact resistance, top load, Environmental Stress Crack Resistance (ESCR), and chemical resistance. In addition, the manufacturers of such parts desire ease of processability including thermoformability. Accordingly, the polymers chosen for use in extruded sheet and thermoforming applications require a balance of rheological properties. The ideal polymers will provide suitable kinematics for improved extrudability, and adequate sag or drape resistance while simultaneously allowing adequate extensibility for uniform and consistent final part thickness. This will ideally be accomplished without sacrificing any of the desired solid state performance properties of the polymer.

In the development of resin there is typically a trade off between characteristics, such as resistance to slow crack growth and rupture (measured, for instance, by Environmental Stress Crack Resistance or ESCR), stiffness (measured, for instance, by flexural or secant modulus), and toughness (measured by an impact test), and processability (measured, for instance, by shear and extensional flows). Typically the higher the polyethylene molecular weight, the better the solid state properties like ESCR. However, increasing the molecular weight will tend to decrease processability making profile and sheet extrusion and thermoforming more difficult.

High-molecular-weight (HMW) ethylene homopolymers and copolymers typically exhibit improved strength and mechanical properties, including high tensile strength, impact strength and puncture resistance. However, attendant with such increases are difficulties in processability and extrudability of these HMW resins. One approach to solve this problem has been to broaden the molecular weight distribution (MWD) of the HMW polyethylene. One method to achieve this is by catalyst selection, for instance, it is known that chromium catalysts tend to produce a product with broader molecular weight distribution than either traditional Ziegler-Natta (Z-N) or the newer metallocene-based catalyst systems.

Chromium catalysts are well known catalysts for olefin polymerization and are useful in preparing HMW HDPE. In these catalysts, a chromium compound, such as chromium oxide, is supported on a support of one or more inorganic oxides such as silica, alumina, zirconia or thoria, and activated by heating in a non-reducing atmosphere. U.S. Pat. No. 2,825,721 describes chromium catalysts and methods of making the catalysts. It is also known to increase polymer melt index by using a silica-titania support as disclosed, for example, in U.S. Pat. No. 3,887,494. Numerous activation procedures have been described in the prior art for optimizing catalyst performance and resultant ethylene polymer characteristics, such as U.S. Pat. No. 4,981,831, U.S. Pat. No. 5,093,300, U.S. Pat. No. 5,895,770, U.S. Pat. No. 6,150,572, U.S. Pat. No. 6,201,077, U.S. Pat. No. 6,204,346, U.S. Pat. No. 6,214,947, U.S. Pat. No. 6,359,085 and U.S. Pat. No. 6,569,960, US2001/0004663 and US2001/0007894, EP1038886A1, EP0882740A1, EP0882743A1, EP0905148, and WO00/14129 and WO2005/052012. While these known techniques help in optimizing the resulting polymer characteristics, it has been observed that the current resins made via the gas phase process still exhibit a higher degree of sag or drape than resins made using the slurry loop process. This higher sag requires processors using gas phase resins to change tooling or process conditions relative to other resins, and as result, resins from the gas phase process have not been widely accepted in the industrial thermoforming market.

Another method used to overcome the processing difficulties associated with HMW polyethylene has been to increase the MWD of the polymer by providing a blend of a HMW polymer with a low-molecular-weight (LMW) polymer. The goal of such a formulation is to retain the excellent mechanical properties of the high molecular weight polyethylene, while also providing improvements in processability, resulting from the improved extrudability of the lower molecular weight component. For example, U.S. Pat. No. 6,458,911 and US2002/0042472A1 disclose a bimodal ethylene polymer film resin comprising a polymer blend, of a LMW component and a HMW component. The blends are said to be capable of being formed into high strength thin films. These processes add unwanted complexity and expense to the process however, and so it would be desirable to have a single resin which would adequately deliver the desired combination of properties.

Accordingly, it is desired to develop a gas-phase HMW HDPE resin having improved sag or drape resistance without unduly limiting the extensibility.

The invention provides such a composition, a process to make such compositions and products made by the compositions.

More particularly, the present invention relates to the use of oxygen tailoring to increase the melt strength of chromium catalyzed HDPE without decreasing the extensibility or elongational viscosity properties of the resin to such a point that the HDPE no longer has enough extensibility to make various part sizes and types.

Oxygen tailoring is a known process whereby molten polyethylene resin is exposed to low levels of oxygen at normal polymer melt temperatures which allows for the limited coupling of polymer chains. However, the use of oxygen tailoring has heretofore primarily been focused on bimodal HDPE, and primarily for blown film applications (see for example U.S. Pat. No. 5,728,335, U.S. Pat. No. 6,454,976, EP0936049, WO2004/005357, WO2005/061561, US2004/0039131A1 and US2005/0012235A1).

It has surprisingly been found that the oxygen tailoring process can also be used to reduce the sag in extruded sheets made from HDPE. Without intending to be bound by theory, it is believed that the oxygen tailoring introduces low levels of long chain branching in the resin. This long chain branching increases the melt strength of the resin, but it is believed that the levels of long chain branching are low enough so as not to cause significant changes or unduly limit neither the extensional viscosity nor the solid state performance of the resin. This effect is particularly noticed with HDPE made using chromium based catalysts.

Accordingly in a first embodiment, the present invention comprises a process for making an extruded sheet comprising the steps of conveying an HDPE resin through an extruder, wherein the extruder comprises a feed zone, a first melt zone downstream of the feed zone, a second melt zone downstream of the first melt zone and a third melt zone downstream of the second melt zone; contacting the HDPE resin with a gaseous medium comprising oxygen in the second melt zone, under conditions sufficient to promote at least some long chain branching, thereby producing a modified HDPE resin; contacting the modified HDPE resin with at least one antioxidant (which may be a primary antioxidant, a secondary antioxidant, or a combination of the two antioxidants, with or without other adjuvants) in the third melt zone; passing the resin which has been contacted with the antioxidant through a die to form sheet having a thickness in the range of 0.25 mm to 25 mm. It should be readily understood by a person of ordinary skill in the art that the resin which has been contacted with the antioxidant may first be formed into pellets, which may thereafter be extruded into sheet.

Sheets made in such a fashion will be characterized as having less sag, than a corresponding sheet of the same thickness produced using an unmodified HMW HDPE chrome catalyst in the gas phase process. Sag can be represented by the drooping (or sag) of resin in the thermoforming operation at the completion of the heating cycle. Lower drooping (or sag) levels are desired. It has been observed that the observed sag is related to either the viscosity at $10^{-2}$ sec$^{-1}$ in dynamic mechanical spectroscopy (DMS) test, which measures viscosity as a function of oscillation frequency, or by the ratio of the viscosity at $10^{-4}$ sec$^{-1}$, as measured in a creep test, to the viscosity at $10^{2}$ sec$^{-1}$ shear rates. Resins with higher viscosities and/or higher viscosity ratios are expected to have higher resistance to sag.

DEFINITIONS AND TESTING PROTOCOLS

Figure 1:
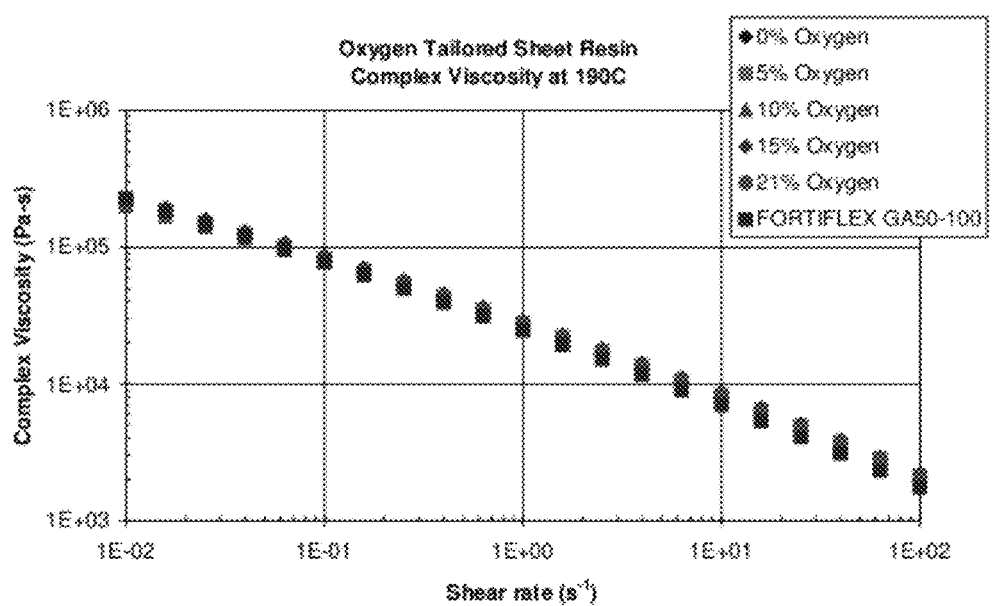
FIG. 1 is a plot showing shear viscosity for Examples CE1 to CE5 along with a commercially available material.

Any numerical range recited herein, include all values from the lower value to the upper value, in increments of one unit, provided that there is a separation of at least 2 units between any lower value and any higher value. As an example, if it is stated that the amount of a component, or a value of a compositional or physical property, such as, for example, amount of a component, melting temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. Numerical ranges for melt indexes, density, number of carbon atoms in an alpha-olefin, and other properties have been described herein.

The term "polymer" is used herein to indicate, a homopolymer, or an interpolymer (including a copolymer). The term "polymer," as used herein, includes interpolymers, such as, for example, those made by the copolymerization of ethylene with one or more $C_3$-$C_{10}$ alpha olefin(s).

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene/α-olefin," "ethylene interpolymer (or copolymer)," and similar terms, as used herein, refers to an ethylene-based interpolymer that contains at least 50 mole percent ethylene, and one or more additional comonomers.

The term "unimodal," as used herein, means the MWD in a Gel Permeation Chromatography (GPC) curve, does not substantially exhibit multiple component polymers, that is, no humps, shoulders or tails exist, or are substantially discernible, in the GPC curve. In other words, the DOS (Degree of Separation) for the resulting GPC curve is zero or substantially close to zero. DOS is determined by deconvoluting the GPC curve into two components: LMW component and HMW component. After deconvolution, the peak width at half maxima (WAHM) and the average molecular weight ($M_w$) of each component can be obtained. Then the degree of separation (DOS) between the two components can be calculated by equation 2, as follows:

$$DOS = \frac{\log(M_w^H) - \log(M_w^L)}{WAHM^H + WAHM^L}, \quad (2)$$

wherein $M_w^H$ and $M_w^L$ are the respective weight average molecular weight of the HMW component and the LMW component; and $WAHM^H$ and $WAHM^L$ are the respective peak width at the half maxima of the deconvoluted molecular weight distribution curve for the HMW component and the LMW component.

The term "bimodal," as used herein, means that the MWD in a GPC curve exhibits two component polymers, wherein one component polymer may even exist as a hump, shoulder or tail, relative to the MWD of the other component polymer.

The term "multimodal," as used herein, means that the MWD in a GPC curve exhibits more than two component polymers, wherein one component polymer may even exist as a hump, shoulder or tail, relative to the MWD of the other component polymer.

As used herein, the term "rheology modification" means change in melt viscosity of a polymer as determined by creep measurements and/or DMS.

The term "melt processing" is used to mean any process in which the polymer is softened or melted, including, but not limited to, extrusion, pelletizing, film blowing and casting, sheet formation, thermoforming, compounding in polymer melt form.

The terms "blend" or "polymer blend," or similar terms, as used herein, mean a blend of two or more polymers. Such a blend may or may not be miscible. Such a blend may or may not be phase separated. Such a blend may or may not contain one or more domain configurations, as determined from transmission electron microscopy.

Resin density was measured by the Archimedes displacement method, ASTM D 792-03, Method B, in isopropanol. Specimens were measured within 1 hour of molding after conditioning in an isopropanol bath at 23° C. for 8 min, to achieve thermal equilibrium prior to measurement. The specimens were compression molded according to ASTM D-4703-00 Annex A, with a 5 min initial heating period at approximately 190° C., and a 15° C./min cooling rate per Procedure C. The specimen was cooled to 45° C. in the press with continued cooling until "cool to the touch."

Melt flow rate measurements were performed according to ASTM D-1238-03, Condition 190° C./2.16 kg, Condition 190° C./5.0 kg, Condition 190° C./10.0 kg and Condition 190° C./21.6 kg, and are known as $I_2$, $I_5$, $I_{10}$ and $I_{21.6}$ respectively. Melt Flow Ratio (MFR) is the ratio of melt flow rate ($I_{21}$) to melt flow rate ($I_2$), unless otherwise specified. For example, in some instances the MFR may be expressed as $I_{21}/I_5$, especially for higher molecular weight polymers.

Polymer Rheology Measurements

The sample was compression molded into a disk for rheology measurement. The disks were prepared by pressing the samples into 0.071 inch (1.8 mm) thick plaques, and which were subsequently cut into 1 inch (25.4 mm) diameter disks. The compression molding procedure was as follows: 365° F. (185° C.) for 5 min at 1500 psi (10.3 MPa); cooling at 27° F. (15° C.)/min to ambient temperature (about 23° C.).

The resin rheology was measured on the ARES I (Advanced Rheometric Expansion System) Rheometer. The ARES is a strain controlled rheometer. A rotary actuator (servomotor) applies shear deformation in the form of strain to a sample. In response, the sample generates a torque, which is measured by the transducer. Strain and torque are used to calculate dynamic mechanical properties, such as modulus and viscosity. The viscoelastic properties of the sample were measured in the melt using a parallel plate set up, at constant strain (5 percent) and temperature (190° C.), and as a function of varying frequency (0.01 $sec^{-1}$ to 500 $sec^{-1}$). The storage modulus (G'), loss modulus (G"), tan delta, and complex viscosity (eta*) of the resin were determined using Rheometrics Orchestrator software (v. 6.5.8).

Low shear rheological characterization (Creep) was performed on a Rheometrics SR5000 (from Rheometrics) in stress controlled mode, using a 25 mm (diameter) parallel plate fixture (gap around 1.5 mm). This type of geometry was preferred to cone and plate because it requires only minimal squeezing flow during sample loading, thus reducing residual stresses. Creep measurements were carried out at 170° C. and 190° C. After zeroing the gap between the parallel plates, the temperature was increased to 220° C. for sample loading (about 5 min) in order to accelerate the relaxation of normal stresses, and then decreased to the measuring temperature. Creep test was performed under a stress of 20 Pa, which is the best compromise to have a good signal to noise (S/N) ratio, while remaining in the linear (low deformation) regime. The deformation was recorded with time up to 30,000 sec, or until the viscosity leveled off, indicating that the steady state was reached. The steady-state viscosity was determined using the automatic feature of the Rheometrics Orchestrator software (v. 6.5.8). Several repeats were run until the standard deviation on the steady-state viscosity decreased below 4 percent.

A Dynamic Mechanical Spectroscopy (DMS), also called frequency sweep, test in stress-controlled mode was performed before and after the first creep run to check for degradation. The angular frequency was varied from 0.01 $sec^{-1}$ to 100 $sec^{-1}$ with a stress amplitude of 1000 Pa, which corresponds to strain amplitudes between 0.1 percent (at 100 $sec^{-1}$) and 10 percent (at 0.1 $sec^{-1}$). It was concluded that stability was good. On the subsequent runs, the DMS test was run only after the creep test to avoid introducing perturbations due to shear history.

The steady-state data point from creep was combined with the viscosity curve from DMS to extend the accessible range of shear rates down to $10^{-6}$ $sec^{-1}$, and fitted with the 4-parameter Carreau-Yasuda model:

$$\eta = c_1(1+(c_2 x)^{c_3})^{(c_4-1)/c_3} \quad (11).$$

Elongational Viscosity was measured at 170° C. on an SER fixture (Xpansion Instruments, Tallmadge, Ohio (USA)) at Hencky strain rates of 1 $sec^{-1}$, 10 $sec^{-1}$ and 20 $sec^{-1}$. The Hencky strain, sometimes referred to as true strain, is a measure of elongational deformation that applies to both polymer melts and solids. If an end-separation device such as an Instron tester is used, the Hencky strain can be calculated as $\ln(L(t)/L_0)$, where $L_0$ is the initial length and $L(t)$ the length at time t. The Hencky strain rate is then defined as $1/L(t) \cdot dL(t)/dt$, and is constant only if the length of the sample is increased exponentially.

On the other hand, using the SER (Sentmanat Extensional Rheometer), an elongational device with constant gauge length based on the dual wind-up device of Sentmanat (U.S. Pat. No. 6,691,569), a constant Hencky strain rate is simply obtained by setting a constant winding speed. The SER fits inside the environmental chamber of an ARES rheometer (TA Instruments, New Castle, Del. (USA)), in which the temperature is controlled by a flow of hot nitrogen. Tests were carried out on strips cut out of a 0.5 mm thick compression molded sheet. A constant Hencky strain rate was applied, and the time-dependent stress was determined from the measured torque and the sample time-dependent cross-section. The elongational viscosity, or uniaxial stress growth coefficient, is obtained by dividing the stress by the Hencky strain rate.

Rheotens (Goettfert Inc., Rock Hill, S.C., US) melt strength experiments were carried out at 190° C. The melt was produced by a Göttfert Rheotester 2000 capillary rheometer with a flat, 30/2 die, at a shear rate of 38.2 $sec^{-1}$. The barrel of the rheometer (diameter: 12 mm) was filled in less than one minute. A delay of 10 minutes was allowed for proper melting. The take-up speed of the Rheotens wheels was varied with a constant acceleration of 2.4 mm/$sec^2$. The tension in the drawn strand was monitored with time until the strand breaks. The steady-state force and the velocity at break are reported.

DETAILED DESCRIPTION OF INVENTION

In a first aspect the present invention is directed to a process for making an extruded profile especially a sheet comprising:

a) conveying an HDPE resin through an extruder, wherein the extruder comprises a feed zone, a first melt zone downstream of the feed zone, a second melt zone downstream of the first melt zone, and a third melt zone downstream of the second melt zone;

b) contacting the HDPE resin with a gaseous medium comprising oxygen in the second melt zone, under conditions sufficient to promote at least some long chain branching thereby producing a tailored HDPE resin;

c) contacting the tailored HDPE resin with a primary or secondary oxidant, or both, as well as other optional adjuvants in the third melt zone;

d) passing the resin resulting from step (c) through a die to form a sheet having a thickness in the range of 0.25 mm to 25 mm.

In one embodiment, the contact in step b) results in an increase in the amount of long chain branching, as determined by viscosity measurements as described herein and/or melt strength measurements as described herein.

The invention also provides a composition comprising a tailored HDPE resin formed by a process comprising:

a) conveying an HDPE resin through an extruder, wherein the extruder comprises a feed zone, a first melt zone downstream of the feed zone, a second melt zone downstream of the first melt zone; and b) contacting the HDPE resin with a gaseous medium comprising oxygen in the second melt zone, under conditions sufficient to promote at least some long chain branching thereby producing a tailored HDPE resin.

In a further embodiment, the composition further comprises a primary or secondary oxidant, or both, as well as other optional adjuvants. In another embodiment, the tailored HDPE resin is contacted with a primary or secondary oxidant, or both, as well as other optional adjuvants, in a third melt zone of an extruder which is down stream from the second melt zone as discussed above.

An inventive composition may comprise one or more embodiments as they relate to compositional and/or process features, each as described herein.

The first step of the invention process involves conveying the resin through an extruder. For the purposes of this invention the term "extruder" includes any equipment which allows polymeric material to be in at least a partially molten state, while providing for mixing of the polymeric material with an oxygen containing gas, and then allows for the polymeric material to exit through a shape forming die where the polymeric material is allowed to cool. The term extruder is used for its broadest meaning to include such devices as a device which extrudes pellets as well as devices in which the polymeric material is extruded in the form of sheets or other desired shapes and/or profiles.

The term "zone," as used herein in reference to an extruder, refers to specific unit operations, such as conveying, melting, mixing, injection, reaction, venting, and other operations. Thus, the term "first melt zone," as used herein, refers to the initial melting of the HDPE resin, the term "second melt zone," as used herein, refers to the contacting the melted resin with a gaseous medium comprising oxygen to form a tailored HDPE, and the term "third melt zone,' as used herein, refers to the addition of an antioxidant(s) to the tailored HDPE.

In a preferred embodiment, the first melt zone is a zone in which the granular material is conveyed in the mixer and changes form from solid to molten polymer. The second melt zone, which occurs after the first melt zone, is in a decompression zone, where gases, including oxygen, are brought into contact with the molten polymer. This zone is preferably sealed off from the first zone by the molten polymer. The third zone, which occurs after the second zone, is positioned before the melt pump, and consists of polymer exiting the extruder screws, and being conveyed in a chamber to the melt pump. The additives are pumped into this zone or chamber. The final composition is then fed through the melt pump for pelletization. Preferably, the third zone is sealed off from the second zone as well.

Extruders and processes for extrusion are described in U.S. Pat. No. 4,814,135, U.S. Pat. No. 4,857,600, U.S. Pat. No. 5,076,988 and U.S. Pat. No. 5,153,382, each fully incorporated herein by reference. Examples of various extruders, which can be used in forming the pellets are single screw and multiscrew types. A typical pelletizing extruder can be illustrated by a two stage twin screw melter/mixer with a feed section and a vent section, a gear pump, a pelletizing device, and various other sections. Another typical pelletizing extruder can be illustrated by a two stage single screw extruder. Thus, the term "extruder," as used in this specification, is considered to include conventional extruders and mixers, both of which are can be adapted to form pellets or sheets.

A typical single screw, single stage extruder can be described as one having a hopper at its upstream end and a die at its downstream end with a screw design that has a single set of feed, compression/transition and metering sections. In a two-stage extruder, the screw portion is divided up into many sections, a feed section, a compression section, a metering section, which is followed by another feed section or a vent section, another compression section, a final metering section, and multiple heating sections from the rear heating section to the front heating section, the multiple heating sections running from upstream to downstream. There can be one or more vent sections.

If the extruder has more than one barrel, the barrels are connected in series. The length to diameter ratio of typical single screw extruders is in the range of 16:1 to 36:1, and the length to diameter ratio of typical twin screw mixers is in the range of 5:1 to 30:1.

In twin screw mixer/gear pump extrusion systems, which are typically starved fed, that is, the feed section is partially filled, polymer temperature can be controlled by controlling the speed of the mixer, by adjusting feed rate, by adjusting mixing/temperature/residence time control devices, that is, commercially available control devices uniquely designed by each twin screw manufacturer which are commonly referred to as "gate position" in Kobe™ LCM twin screw mixers, "slot position" in JSW™ CMP twin screw mixers, etc., and by adjusting gear pump suction pressure (for example, see U.S. Pat. No. 4,452,750, fully incorporated herein by reference). Typically, increasing speed, decreasing feed rate, closing "mixing" control devices, and increasing gear pump suction pressure increases polymer temperature. It should be noted that in high capacity twin screw mixers, barrel metal temperature has only a minor effect on polymer temperature. This phenomenon is due to the low overall heat transfer coefficient of polymers, that is, polymers are typically good insulators.

In two stage single screw extruders, which are typically flood fed, that is, the feed section is essentially filled with particulate (unmolten) polymer, temperature control is typically adjusted by screw speed, extruder discharge pressure and barrel temperatures. In contrast to high capacity twin screw mixers, the overall capacity of single screw extruders is much lower on a rate to barrel diameter basis, and therefore barrel temperature control has an increased effect on polymer temperature.

In flood fed extruders, although the feed section is filled with particulate polymer, typically in granular or pellet form, the gaseous mixture can still be successfully introduced due to the porosity of the particulates. In fact, depending on the design of the feed section, the flow rate of the gaseous mixture may need to be controlled to insure that the particulates in the feed section are not inadvertently fluidized, possibly reducing the overall capacity of the extruder.

For the purposes of this specification, the zones of the pelletizing extruder have been divided into essentially filled zones and partially filled zones. The "essentially" filled zones are those sections of the extruder that are almost completely filled with polyethylene, usually in the molten state. The "partially" filled zones are those sections of the extruder that are partially filled with polyethylene. In the feed section, the polyethylene is in particulate form. In other sections, the polyethylene is generally in a molten state. The term "partially" filled means that 5 to 95 percent of the zone (on a volume basis) is filled with polyethylene. Preferably 5 to 40 percent of the zone is filled, and most preferably about 10 percent of the zone is filled with polyethylene. In starved fed extruders, the partially filled zones are generally the feed and vent sections. The zones, other than the partially filled zones, are operated as essentially filled zones.

The atmosphere in the partially filled zones is a mixture of an inert gas (such as nitrogen) and oxygen, wherein the oxygen can be present in the range of 1 percent to 21 percent by volume based on the volume of the gaseous mixture, and is preferably in the range of 10 percent to 21 percent by volume, and most preferably in the range of 18 percent to 21 percent by volume. The preferred method for controlling the oxygen concentration is by continuously mixing air and nitrogen via flow control valves to achieve the desired oxygen concentration and continuously replenishing the partially filled sections with the newly made gas mixture.

In order to reduce the cost and keep the tailoring operation as simple as possible, which, in turn, usually improves the overall operation, like gaseous mixtures can be simultaneously introduced into each partially filled zone. Alternatively, depending on the degree of tailoring required, gaseous mixtures with higher or lower oxygen concentrations can be separately introduced into each partially filled zone.

It will be understood that the design and operation of each extrusion system will depend on the resin to be processed, the desired through-put rates, and the desired properties of the ultimate product. In general, however, the design and operation will be conventional provided that the requirements of subject invention are met.

The phrase "at least some long chain branching," as used herein, refers to long chain branches formed by one or more coupling processes which involve oxygen. This feature is indicated by an increase in shear viscosity at $10^{-4}$ $sec^{-1}$ (measured at 190° C.) and/or an increase in the ratio of shear viscosity at $10^{-4}$ $sec^{-1}$ to shear viscosity at $10^{+2}$ $sec^{-1}$ (each measured at 190° C.). Each viscosity measurement is described herein.

In some embodiments, long chain branching may also be analyzed using GPC data (measure the deviation from the Mark Houwink equation for linear polymers). The final polymer should be appropriately soluble in suitable GPC solvent(s).

The term "tailored HDPE," "oxygen-tailored HDPE", "coupled HDPE," "oxygen-coupled HDPE," and similar terms, refer to the HDPE product that results when the HDPE resin is contacted with a gaseous medium comprising oxygen, in accordance with the present invention.

The term "resin,' as used herein refers to a polymeric composition containing polymer only, or containing polymer and optionally one or more additives.

In one embodiment, the HDPE resin contains no additives prior to contact with the gaseous medium comprising oxygen.

The HDPE chosen for use in such process include ethylene homopolymers and/or or ethylene copolymers or higher interpolymers. Preferably, the HDPE is an ethylene copolymer having a unimodal MWD. Preferred comonomers used for the HDPE include $C_3$-$C_{20}$ aliphatic alpha-olefins, and more preferably $C_3$-$C_{10}$ aliphatic alpha-olefins. Preferably, the comonomer is selected from the group consisting of propylene, 1-butene, 1-pentene, 1-hexene, 1-heptene, 1-octene, 1-nonene, 1-decene and 4-methyl-1-pentene. Particularly preferred comonomers are selected from the group consisting of propylene, 1-butene, 1-hexene, and 1-octene, preferably 1-hexene and 1-octene, and more preferably 1-hexene. In another embodiment, the polyethylene component may also contain at least one polyene, including, but not limited to, conjugated and nonconjugated dienes.

The density of the HDPE generally ranges from 0.940 g/cc to 0.955 g/cc (ASTM 792-03), preferably in the range from 0.945 g/cc to 0.954 g/cc and most preferably from 0.946 g/cc to 0.953 g/cc and optimally from 0.947 g/cc to 0.953 g/cc.

The melt flow rate, $I_{21}$, of the HDPE is preferably in the range from 5 dg/min to 20 dg/min, preferably from 6 dg/min to 18 dg/min, most preferably from 7 dg/min to 15 dg/min, and optimally from 8 dg/min to 14 dg/min.

The flow rate ratio, $I_{21}/I_2$, of the polymer is advantageously in the range from 75 to 250, preferably from 85 to 245 and most preferably from 90 to 240. In another embodiment, the $I_{21}/I_2$ is from 75 to 200.

Although HDPE produced by other catalyst systems are within the scope of the broadest aspect of the present invention, HDPE product by chromium based catalysts are preferred. Typically these resins are produced in a single reactor configuration, although the HDPE used in the present invention is not limited to that produced in a single reactor, and HDPE can be used, which is produced in two or more reactors in series, in parallel or in a combination thereof.

Polyethylene resins polymerized from these chromium based catalysts, and methods to make them, are generally known in the art. This includes gas-phase, solution phase and slurry-phase polymerization processes. Of particular interest to the present invention are resins made in the gas-phase process, those made using a chromium catalyst, and in particular, a titanated chromium catalyst.

Typically, useful catalysts consist of a chromium (VI) compound (typically as the oxide), and are supported on a high surface area refractory oxide support. Generally the support is an amorphous microspheroidal silica, silica alumina, silica titania or aluminophosphate. The catalyst is prepared by activating the chromium-containing support at temperatures of 400° C. to 1000° C., in a dry, oxygen-containing atmosphere. In some applications, it is preferred that the activation temperature be in a range of from 400° C. to 600° C., in other applications, the preferred range may be from 601° C. to 750° C., and in other application the range may be from 751° C. to 1000° C. Modifying materials such as titanium and fluoride are generally added prior to the activation.

In one embodiment, the HDPE resin used in step (a) is initially polymerized from a Ti modified CrO catalyst in a gas phase reactor, where the catalyst activation temperature is from 400° C. to 1000° C. In a further embodiment, the catalyst activation temperature is from 400° C. to 600° C. In another embodiment, the catalyst activation temperature is from 601° C. to 750° C. In yet another embodiment, the catalyst activation temperature is from 751° C. to 1000° C. In a further embodiment, the polymerization temperature is from 95° C. to 100° C.

Generally, catalysts are prepared by using commercially available silica, to which a chrome source has been added. The silica substrate may be treated with a titanium ester (titanium tetraisopropylate or titanium tetraethoxide are typically used) either after the Cr compound is deposited or prior to this deposition. The support is generally pre-dried at 150° C. to 200° C. to remove physically adsorbed water. The titanate may be added as a solution to a slurry of the silica in isopentane solvent or directly into a fluidized bed of support. If added in slurry form, the slurry is dried. Generally, the Cr compound, which is convertible to $Cr^{+VI}$, has already been added to the support. The support is then converted into active catalyst by calcination in air at temperatures up to 1000° C.

During activation, the titanium is converted to some type of surface oxide. The chromium compound (generally chromium (III) acetate) is converted to a $Cr^{+VI}$ oxide of some kind. Fluoridation agents may also be added during the activation process to selectively collapse some pores in the support, modifying the molecular weight response of the catalyst. The activated catalyst may also be treated with reducing agents prior to use, such as carbon monoxide in a fluidized bed, or other reducing agents, such as aluminum alkyls, boron alkyls, lithium alkyls.

Catalysts of this type are described in numerous patents, such as WO2004094489, EP0640625, U.S. Pat. No. 4,100,105, and the references cited therein. Each of these references is incorporated, in its entirety, by reference. For example, a useful catalyst is a supported chromium-titanium catalyst (or titanated chrome oxide catalyst) which is substantially non-spherical or irregular in shape, and has a broad particle size distribution, with at least 70 percent of its pore volume ranging in pores of diameter between 200 angstrom to 500 angstrom. Such a supported complex can be activated by heating in the presence of oxygen, at a temperature from 850° C. to the sintering temperature of the supported complex. Catalysts such as those described in U.S. Pat. No. 6,022,933, also containing a $Cr^{+VI}$ component, are also useful in the invention. This reference is also incorporated herein, in its entirety, by reference.

The polymerization in the reactor is preferably conducted in the gas phase using a continuous fluidized bed process. In a typical fluidized bed reactor, the bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, that is, comonomers, and, if desired, modifiers and/or one or more inert carrier gases.

A typical fluid bed system includes a reaction vessel, a bed, a gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687, the entire contents of which are herein.

The gaseous feed streams of ethylene, other gaseous alpha-olefins, and hydrogen, when used, are preferably fed to the reactor recycle line, as well as liquid alpha-olefins and the cocatalyst solution. Optionally, the liquid cocatalyst can be fed directly to the fluidized bed. The partially activated catalyst precursor is preferably injected into the fluidized bed as a mineral oil slurry. Activation is generally completed in the reactors by the cocatalyst. The product composition can be varied by changing the molar ratios of the monomers introduced into the fluidized bed. The product is continuously discharged in granular or particulate form from the reactor as the bed level builds up with polymerization. The production rate is controlled by adjusting the catalyst feed rate and/or the ethylene partial pressures in the reactor (or reactors).

The pressure, that is, the total pressure in the reactor(s), can be in the range of 200 psig to 500 psig (pounds per square inch gauge; 1.38 MPa to 3.45 MPa), and is preferably in the range of 280 psig to 450 psig (1.93 MPa to 3.10 MPa). The ethylene partial pressure in the reactor(s) can be in the range of 10 psig to 280 psig (0.0689 MPa to 1.93 MPa), and is preferably in the range of 50 psig to 270 psig (0.344 MPa to 1.86 MPa), and more preferably is in the range of 75 psig to 260 psig (0.517 MPa to 1.79 MPa). The balance of the total pressure is provided by alpha-olefin other than ethylene and an inert gas such as nitrogen. Other inert hydrocarbons, such as an induced condensing agent, for example, isopentane, hexane also contribute to the overall pressure in the reactor according to their vapor pressure under the temperature and pressure experienced in the reactor.

The hydrogen to ethylene mole ratio can be adjusted to control average molecular weights. The alpha-olefins (other than ethylene) can be present in a total amount of up to 15 percent by weight of the copolymer, and, if used, are preferably included in the copolymer in a total amount of 0.4 percent to 10 percent by weight, or more preferably 0.7 percent to 4 percent by weight, based on the weight of the copolymer.

The residence time of the mixture of reactants including gaseous and liquid reactants, catalyst, and resin in the fluidized bed can be in the range of 1 hour to 12 hour, and is preferably in the range of 1.5 hour to 5 hour.

The reactor(s) can be run in the condensing mode, if desired. The condensing mode is described in U.S. Pat. No. 4,543,399, U.S. Pat. No. 4,588,790 and U.S. Pat. No. 5,352,749, the entire contents of which are herein.

While the polyethylene blends of subject invention are preferably produced in the gas phase by various low pressure processes, the blend can also be produced in the liquid phase in solutions or slurries, or as a combination of slurry and gas phase, or gas phase and solution, or slurry and solution, each in either order, by conventional techniques, again at low pressures. Low pressure processes are typically run at pressures below 1000 psi (6.90 MPa) whereas high pressure processes are typically run at pressures above 15,000 psi (103 MPa).

Preferred operating temperatures vary depending on the density desired, that is, lower temperatures for lower densities and higher temperatures for higher densities. Polymerization reaction operating temperatures can also change the solid state performance properties of the polymer. Operating temperatures will vary of from 70° C. to 110° C. In one embodiment operating temperatures are from 95° C. to 110° C. In other embodiments, operating temperatures are less than, or equal to, 95° C., and in still other embodiments less than, or equal to, 90° C., and yet further embodiments less than, or equal to, 85° C. The mole ratio of alpha-olefin to ethylene in this reactor can be in the range of from 0.0005:1 to 0.8:1, and is preferably in the range of from 0.001:1 to 0.35:1. The mole ratio of hydrogen (if used) to ethylene in this reactor can be in the range of from 0.001:1 to 0.3:1, preferably of from 0.01 to 0.2:1.

Some blends are made in a single reactor using a mixed catalyst. In such mixed catalyst systems, the catalyst composition may include a combination of two or more Ziegler-Natta catalysts, two or more metallocene-based catalysts, such as those described in U.S. Pat. No. 4,937,299, U.S. Pat. No. 5,317,036 and U.S. Pat. No. 5,527,752, the entire contents of each are incorporated herein by reference in their entirety, or a combination of Ziegler-Natta and metallocene catalysts. In some embodiments, a dual site metallocene catalyst may be used.

The catalysts feed may be selected from several configurations, including, but not limited to, a supported catalyst system, a spray dried catalyst system, or a solution or liquid fed catalyst system. Polymerization catalysts typically contain a supported transition metal compound and an activator, capable of converting the transition metal compound into a catalytically active transition metal complex.

Supported catalyst configurations typically contain at least one polymerization-active metal compound with a porous support, such as porous silica. Typically, the active metal compound is impregnated within the porous metal oxide. The catalyst morphology may be modified using size classification and/or by modification of chemical properties.

The second step in the process of the preferred invention is to contact the HDPE resin with a gaseous medium comprising oxygen in a second melt zone, under conditions sufficient to promote at least some long chain branching, thereby producing a tailored HDPE resin. The HDPE and gaseous medium are suitably combined in any manner which results in desired reaction thereof, preferably by mixing the gaseous medium with the HDPE(s) under conditions which allow sufficient mixing before reaction (to avoid uneven amounts of localized reaction), then subjecting the resulting admixture to heat sufficient for reaction. The gaseous medium preferably contains 1 percent to 21 percent oxygen by volume. A preferred range is from 5 percent to 21 percent oxygen by volume, and a more preferred range is from 10 percent to 21 percent oxygen by volume, with a most preferred range being from 18 percent to 21 percent oxygen by volume. To facilitate the desired reaction, it is preferred that the temperature in this zone of the extruder be in the range of from 150° C. to 280° C., with 155° C. to 250° C. being a preferred range, and 160° C. to 240° C. being most preferred, and 170° C. to 230° C. being optimal.

The third step in the process of the preferred invention is to add one or more primary or secondary antioxidants or both, optionally with other adjuvants, to the tailored HDPE resin. The point at which primary or secondary antioxidants, or both, as well as other adjuvants, are added, constitutes a third melt zone within the extruder in the preferred process of the present invention. It is believed that the antioxidants (whether primary or secondary) would prevent the incorporation of long chain branching caused by the oxygen, if present during the tailoring reaction, and so it is important that they be added at a point downstream of that reaction. Primary antioxidants, sometimes termed "long-term antioxidants" include phenolic antioxidants and hindered amine antioxidants, such as disclosed in U.S. Pat. No. 6,392,056, fully incorporated herein by reference. The phenolic antioxidants, such as the IRGANOX™ family of antioxidants (for example, IRGANOX 1010 and IRGANOX 1076), commercially available from Ciba Specialty Chemicals, are preferred. Preferably the primary antioxidant is added, such that the tailored HDPE comprises from 100 ppm to 1500 ppm of the primary antioxidant, based on the weight of the HDPE resin.

Preferably, the tailored HDPE is also contacted with one or more secondary antioxidants, sometimes referred to as "short-term antioxidants". These include aliphatic thiols and phosphites, with phosphites being preferred. The secondary antioxidant, if present, can advantageously be added together with the primary antioxidant, although it may be added at any other point after the tailoring step. Preferably the secondary antioxidant is added, such that the tailored HDPE comprises from 100 ppm to 1500 ppm of the secondary antioxidant, based on the weight of the HDPE resin.

Additional, optional additives that can be added include one or more polyethylene glycols, such as CARBOWAX 400 and other CARBOWAX series. These additives are preferably added after the oxygen tailoring reaction. Such additives may be used to improve the color of the resin. In one embodiment, CARBOWAX 400 is added at levels greater than, or equal to, 40 ppm, preferably greater than, or equal to 50 ppm, based on the weight of the HDPE resin. In another embodiment, CARBOWAX 400 is added at levels less than, or equal to, 600 ppm, preferably less than, or equal to 500 ppm, based on the weight of the HDPE resin. In another embodiment, CARBOWAX 400 is added from 50 ppm to 500 ppm, preferably from 75 ppm to 400 ppm, and more preferably from 100 ppm to 250 ppm, based on the weight of the HDPE resin. In one embodiment, least one polyethylene glycol is added to the tailored HDPE in step c). In a further embodiment, the polyethylene glycol is CARBOWAX 400.

The tailored HDPE (when the additives are added post tailoring) will generally exhibit an increase in melt strength over the unmodified HDPE resin, as determined by an increased viscosity at $10^{-2}$ $sec^{-1}$ shear rate, an increased viscosity ratio (viscosity at $10^{-4}$ $sec^{-1}$ shear rate/viscosity at $10^{+2}$ $sec^{-1}$ shear rate), a reduction of sag or drape in sheet formation, and/or an increase in the Rheotens melt strength. Tailored HDPE will exhibit a higher "low-shear-rate viscosity," measured at 190° C. and 0.01 $sec^{-1}$, on the DMS equipment, compared to the Feed-Stock (FS) control. The low shear-rate viscosity, measured at 190° C. and 0.01 $sec^{-1}$, is preferably from 10 percent to 350 percent higher than the same resin without oxygen tailoring, more preferably from 30 percent to 345 percent higher, and most preferably from 50 percent to 340 percent higher. Melt strength (cN) measured by Rheotens is higher than the untailored control when the additives are added post tailoring. It should be noted that the extensional viscosity remained virtually unchanged by the tailoring process with the preferred oxygen tailoring range of 18 percent to 21 percent oxygen. Sag or drape of the sheet during thermoforming was also significantly reduced. Sag or drape is defined as the distance a fixed sheet is deformed during heating, as compared with the horizontal sheet prior to heating. Less deformation or sag or drape is preferred.

In one embodiment, the resin resulting from step (c) is characterized as having at least a 17 percent increase in melt strength over the unmodified HDPE resin as determined by Rheotens at 190° C.

The invention also provides a polyethylene sheet formed from a tailored polyethylene resin having the following characteristics: (i) higher viscosity at $10^{-4}$ $sec^{-1}$ shear rate, (ii) higher ratio of viscosity at $10^{-4}$ $sec^{-1}$ shear rate to viscosity at $10^{+2}$ $sec^{-1}$ shear rate, (iii) higher Rheotens melt strength as measured in cN, (iv) less sag in inches, (v) with no change in extensional viscosity, each as compared to the original starting material. The invention also provides an article comprising at least one component formed from such a sheet.

The invention also provides a tailored polyethylene resin having the following characteristics: (i) higher viscosity at $10^{-4}$ sec$^{-1}$ shear rate, (ii) higher ratio of viscosity at $10^{-4}$ sec$^{-1}$ shear rate to viscosity at $10^{+2}$ sec$^{-1}$ shear rate, (iii) higher Rheotens melt strength as measured in cN, (iv) less sag in inches, (v) with no change in extensional viscosity, each as compared to the original starting resin prior to tailoring. The invention also provides an article comprising at least one component formed from such a tailored polyethylene.

The invention also provides an extruded sheet formed from an inventive process. The invention also provides an article comprising at least one component formed from such an extruded sheet.

The final step of the broadest aspect of the present invention is to pass the resin, which has been contacted with the primary (and optionally secondary) antioxidant, through a die to form a sheet having a thickness in the range of 0.25 mm to 25 mm, with a preferred range of from 0.5 mm to 15 mm, a more preferred range of from 1.0 mm to 13 mm, and an even more preferred range of from 1.2 mm to 12 mm. It should be understood that this final step does not necessarily have to immediately follow the previous step. For example, it may be advantageous to first form pellets of the tailored material (preferably after incorporating the antioxidant(s)), and then these pellets could be shipped to another location where they could be re-extruded and formed into a sheet. In another embodiment, the resin is first formed into pellets, and then remelted to form an inventive sheet.

While it is within the scope of the invention that the reaction take place in a solvent or other medium, it is preferred that the reaction be in a bulk phase to avoid later steps for removal of the solvent or other medium.

To avoid the extra step and resultant cost of re-extrusion, and to insure that the tailoring agent is well blended into the polymer, in alternative preferred embodiments, it is preferred that the gaseous medium be added to the post-reactor area of a polymer processing plant.

In a preferred embodiment, the tailored resins are substantially gel-free. This is determined by a Film Appearance Rating (FAR) method. This is a visual method, whereby film of 1.5 mils (0.0015 inch, 0.038 mm) in thickness is visually rated with the help of preexisting standards, and rated on a scale from −50 to +50, where the plus values are preferred. Polymers from this invention typically have FAR values of 0 or higher, more preferably of +10 or higher and most preferably of +20 and higher.

Preferably the inventive compositions do not contain peroxides and/or another type of crosslinking agent. It should be understood that gaseous oxygen is excluded from the definition of a peroxide for this invention. Examples of crosslinking agents are described in WO2002/068530, incorporated herein, in its entirety, by reference. Examples of additional crosslinking agents include phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, elemental sulfur, paraquinonedioxime, dibenzoparaquinonedioxime; or combinations thereof.

Extruded sheets and other useful fabricated articles can be made from the novel rheology modified compositions disclosed herein. For example, molding operations can be used to form useful fabricated articles or parts from the compositions disclosed herein, including various injection molding processes (for example, that described in *Modern Plastics Encyclopedia*/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, the disclosures of which are incorporated herein by reference) and blow molding processes (for example, that described in *Modern Plastics Encyclopedia*/89, Mid October 1988 Issue, Volume 65, Number 11, pp. 217-218, "Extrusion-Blow Molding" by Christopher Irwin, the disclosure of which is incorporated herein by reference), profile extrusion (that is, for pipes), calendering, pultrusion.

A blow molded article of the present invention may be manufactured by blow molding the abovementioned tailored polymer composition through the use of a conventional blow molding machine, preferably an extrusion blow molding machine, employing conventional conditions. For example, in the case of extrusion blow molding, the resin temperature is typically from 180° C. to 250° C. The above mentioned tailored polymer composition having a proper temperature is extruded through a die in the form of a molten tube-shaped parison. Next the parison is held within a shaping mold. Subsequently a gas, preferably air, nitrogen or carbon dioxide, or fluorine for improved barrier performance properties, is blown into the mold so as to shape the parison according to the profile of the mold, yielding a hollow molded article. Examples of blow molded articles include bottles, drums, and automotive articles, such as a fuel tank, a seat back, a head rest, a knee bolster, a glove box door, an instrument panel, a bumper facia, a bumper beam, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

Adequate parison sag resistance and polymer melt strength is necessary for producing acceptable blow molded articles, especially large blow molded articles, such as drums and automotive articles. If the polymer's melt strength is too low, the weight of the parison can cause elongation of the parison, causing problems such as variable wall thickness and weight in the blow molded article, part blow-out, neck down. Too high of a melt strength can result in rough parisons, insufficient blowing, excessive cycle times.

In one embodiment, the sheet is characterized as having a sag after heating, via infrared absorption for a period of 150 seconds, of less than 2.0 inch (50.8 mm), as measured by a light curtain, when the sheet has the dimensions of 24 inch (610 mm) by 36 inch (914 mm) by 0.120 inch (3.05 mm) thick. In a further embodiment, the sheet is further characterized as having a sag less than 1.8 inch (45.7 mm), as measured by a light curtain. In yet a further embodiment, the sheet is further characterized as having a sag less than 1.7 inch (43.2 mm), as measured by a light curtain.

The sheets or other parts of the present invention are characterized by having smooth surfaces with wall thickness uniformity, and when thermoformed meet the wall thickness distribution requirements demanded in the particular part application. Resins with excessive sag will, when thermoformed into sheets, generally not be able to be formed into acceptable parts. Likewise resins with insufficient extensional viscosity will, when thermoformed into sheets, generally not be able to be formed into acceptable parts, mainly due to holes in the corners of the parts. Thin spots in various deep draw sections of parts are one sign of poorer extensional viscosity in the thermoforming operation. The physical properties (tensile, flexural, impact, ESCR, etc.) of sheets produced from tailored resins produced in this invention will be very similar to the competitive grades produced in the slurry loop process or non-oxygen tailored gas phase resins. Small differences in orientation of the extruded sheets can be measured using a shrinkage test (strips are cut out of the sheet, initial dimensions measured, the strips are annealed in an oven then the final dimensions measured). Differences in melt properties show up during processing (primarily thermoforming) of the materials, for example, non-oxygen tailored gas phase resins sag more than competitive slurry loop resins at the same sheet temperature or heating time.

EXAMPLES OF THE INVENTION

The following commercial resins are used as controls:
DGDA-5110: This is a gas phase CrO catalyzed resin (as further described in Table 3) with the typical phenolic and phosphite additives added in the mixer hopper during compounding and pelletization. This resin has not undergone any post reaction modification. This resin has excellent extensional flow behavior but sags or drapes more than desired.

Marlex HXM 50-100: This is a commercial sheet extrusion/thermoforming resin that is available in the market place. A sample was purchased as a comparative commercial sample reference. It is a Cr catalyzed HDPE made in a slurry polymerization process, and is further described in Table 3.

Fortiflex GA 50-100: This is a commercial sheet extrusion/thermoforming resin that is available in the market place. A sample was purchased as a comparative commercial sample reference. It is a Cr catalyzed HDPE made a slurry polymerization process, and is further described in Table 3.

EXAMPLES

There are two types of examples: Comparative Examples (CE) which show no change in rheological properties due to addition of the primary/phenolic antioxidants in the mixer hopper, and Inventive Examples (IE) which demonstrate the utility of when the primary/phenolic antioxidants are excluded from the mixer hopper and added downstream. Note that IE1, is not truly an inventive example because it has not been contacted with oxygen.
Example 1: Note Example 1 has one set of reaction conditions and numerous sets of compounding conditions. These numerous compounding conditions are then labeled CE1 to CE5 and IE1 to IE5.

Reaction Process Conditions

Example 1

Reaction conditions and base resin properties for all of Examples CE1 to CE5 and IE1 to IE5 are shown in Table 1. Table 2 lists the compounding conditions for these Examples.

TABLE 1

| Reaction Conditions | |
|---|---|
| CATALYST | Ti modified CrO |
| REACTION CONDITIONS | |
| Temperature (° C.) | 99 |
| Total Pressure (psig) [Mpa] | 348 [2.40] |
| Ethylene Partial Pressure (psi) [Mpa] | 249 [1.72] |
| H2/C2 Molar Ratio | 0.05 |
| C6/C2 Molar Ratio | 0.0019 |
| O2/C2 Flow Ratio | 0.023 |
| Catalyst Feeder Rate (shot/min) | 1.0 |
| Superficial Gas Velocity (ft/sec) [m/sec] | 1.69 [0.515] |
| Bed Weight (lbs) [kg] | 80.7 [36.6] |
| Production Rate (lbs/hr) [kg/hr] | 29.6 [13.4] |
| Residence Time (hr) | 2.72 |
| Fluidized Bulk Density (lbs/ft$^3$) [kg/m$^3$] | 19.1 [306] |
| STY (lb/hr/ft$^3$) [kg m$^3$/hr] | 7.0 [0.0899] |
| BASE RESIN PROPERTIES | |
| Reactor MI(I2) (dg/min) | 0.14 |
| Reactor MI(I5) (dg/min) | 0.66 |
| Reactor FI(I21) (dg/min) | 12.6 |
| Reactor MFR (I21/I2) | 92.6 |
| Reactor MFR (I21/I5) | 19.1 |
| Density (g/cc) | 0.9486 |
| Residual Cr | 0.28 |
| Calculated Ash | |
| Catalyst Productivity | |
| Settled Bulk Density (lb/ft$^3$) [kg/m$^3$] | 30.2 [484] |
| APS (inch) [mm] | 0.037 [0.940] |
| Fines (thru #120 Sieve) | 0.252 |

TABLE 2

| Compounding Conditions$^a$ | | | | | | | | | | |
|---|---|---|---|---|---|---|---|---|---|---|
| | CE-1 | CE-2 | CE-3 | CE-4 | CE-5 | IE-1 | IE-2 | IE-3 | IE-4 | IE-5 |
| Additive Formulation* | Form A | Form A | Form A | Form A | Form A | Form B | Form B | Form B | Form B | Form B |
| Mixer Speed, rpm | 289 | 291 | 292 | 293 | 294 | 293 | 294 | 292 | 291 | 292 |
| Barrel Oil Temp. Set Point (° C.) | 180 | 180 | 180 | 180 | 180 | 180 | 180 | 180 | 180 | 180 |
| Gate Position, Percent | 33 | 33 | 33 | 33 | 33 | 33 | 33 | 33 | 33 | 33 |
| Oxygen Conc. – Supply, Percent | 0 | 5 | 11 | 15 | 20 | 0 | 5 | 10 | 15 | 21 |
| Feed Temp. (° C.) | 17 | 17 | 16 | 18 | 16 | 19 | 18 | 18 | 16 | 16 |
| Mixer SEI, hp-hr/lb | 0.119 | 0.123 | 0.121 | 0.122 | 0.124 | 0.121 | 0.121 | 0.122 | 0.122 | 0.121 |

TABLE 2-continued

| | | | | | | | | | | |
|---|---|---|---|---|---|---|---|---|---|---|
| Gate Indicated Temp. (° C.) | 177 | 178 | 178 | 178 | 178 | 178 | 178 | 178 | 178 | 178 |
| Ind. Discharge Polymer Temp. (° C.) | 222 | 224 | 224 | 225 | 226 | 223 | 225 | 225 | 223 | 224 |
| G/P Suction Pressure (psig) [kPa] | 8 [55] | 7 [48] | 7 [48] | 7 [48] | 8 [48] | 7 [48] | 7 [48] | 7 [48] | 7 [48] | 7 [48] |
| G/P Discharge Pressure (psig) [MPa] | 3250 [22.4] | 3249 [22.4] | 3234 [22.3] | 3258 [22.5] | 3255 [22.4] | 3266 [22.5] | 3230 [22.3] | 3258 [22.5] | 3254 [22.4] | 3242 [22.4] |
| G/P Speed, rpm | 13 | 12 | 11 | 10 | 11 | 12 | 12 | 11 | 11 | 13 |
| G/P SEI, hp-hr/lb | 0.014 | 0.012 | 0.012 | 0.010 | 0.011 | 0.013 | 0.013 | 0.012 | 0.012 | 0.014 |
| Die Pressure (psig) [MPa] | 2342 [16.2] | 2336 [16.1] | 2325 [16.0] | 2343 [16.2] | 2339 [16.1] | 2412 [16.6] | 2375 [16.4] | 2382 [16.4] | 2381 [16.4] | 2369 [16.3] |

[a]Mixer model = LCM-100, Mixer Rotors = EL-2, and Feeder Rate = 800 lb/hr [363 kg/hr]
*Formulation A: Solid and Liquid Irganox 1010  0.0500 wt percent
The Irganox 1010 is fed as a 2 percent mastermix (mastermix contains 2.5 weight percent Irganox and 97.5 weight percent of the HDPE resin (see Table 1)), and is premixed with the base resin via the in-line powder blender before entering the mixer's feed hopper. The mastermix is fed to the extruder such that the final concentration of Irganox 1010 is 0.0500 weight percent.
Weston 399  0.0500 wt percent
Mineral Oil  0.2500 wt percent
The Weston 399 is premixed with mineral oil, and fed as a liquid, downstream of the mixer and upstream of gear pump.
*Formulation B: Liquid Irganox 1076  0.0500 wt percent
Weston 399  0.0500 wt percent
Mineral Oil  0.2000 wt percent
The Irganox 1076 and Weston 399 are premixed with mineral oil and fed as a liquid, downstream of the mixer and upstream of gear pump.

The weight percentages of Irganox 1076, Weston 399 and mineral oil are based on the weight of the final resin (HDPE plus additives).

The melt indices and density measurements for the formulated resins CE1 to CE5 and IE1 to IE5, along with commercial examples, are presented in Table 3.

TABLE 3

Resin Formulations, Melt Index and Density Measurements

| | Examples | | | | | | | |
|---|---|---|---|---|---|---|---|---|
| | Commercial Samples (CS) | | | Comparative Examples (CE) | | | | |
| | Solvay | CP Marlex | Dow | | | | | |
| Resin | Fortiflex G50-100 CS | HXM 50-100 CS | DGDA-5110 Lot 225358 CS | CE-1 Formulation A | CE-2 Formulation A | CE-3 Formulation A | CE-4 Formulation A | CE-5 Formulation A |
| Oxygen Level (Percent) Formulation | | | | 0 | 5 | 10 | 15 | 21 |
| Resin (wt percent) | 100 | 100 | 100 | | | | | |
| I-1010 (wt percent) | | | | 0.05 | 0.05 | 0.05 | 0.05 | 0.05 |
| I-1076 (wt percent) | | | | | | | | |
| Weston 399 (wt percent) | | | | 0.05 | 0.05 | 0.05 | 0.05 | 0.05 |
| Product Properties | | | | | | | | |
| MI2 (g/10 min) | 0.063 | 0.0635 | 0.052 | 0.08 | 0.07 | 0.07 | 0.08 | 0.07 |
| MI5 (g/10 min) | 0.38 | 0.36 | 0.32 | 0.40 | 0.38 | 0.40 | 0.40 | 0.37 |
| MI10 (g/10 min) | 1.52 | 1.58 | 1.44 | 1.63 | 1.51 | 1.56 | 1.65 | 1.60 |
| MI21 (g/10 min) | 10.69 | 10.75 | 10.18 | 9.85 | 9.49 | 9.80 | 9.54 | 9.80 |
| MFR (MI21/MI2) | 169.7 | 169.3 | 195.8 | 127.9 | 130.0 | 134.2 | 122.3 | 140.0 |
| MFR (MI21/MI5) | 28.5 | 29.9 | 32.0 | 24.6 | 25.0 | 24.5 | 24.0 | 26.5 |

TABLE 3-continued

| Resin Formulations, Melt Index and Density Measurements | | | | | | | | |
|---|---|---|---|---|---|---|---|---|
| MFR (MI10/MI2) | 24.2 | 24.9 | 27.8 | 21.1 | 20.6 | 21.4 | 21.2 | 22.9 |
| Density (g/cc) ASTM Slow cooled | 0.9500 | 0.9490 | 0.9496 | 0.9490 | 0.9487 | 0.9494 | 0.9496 | 0.9494 |

| | Examples Inventive Examples (IE) | | | | |
|---|---|---|---|---|---|
| Resin | IE-1 Formulation B | IE-2 Formulation B | IE-3 Formulation B | IE-4 Formulation B | IE-5 Formulation B |
| Oxygen Level (Percent) | 0 | 5 | 10 | 15 | 21 |
| Formulation | | | | | |
| Resin (wt percent) | | | | | |
| I-1010 (wt percent) | | | | | |
| I-1076 (wt percent) | 0.05 | 0.05 | 0.05 | 0.05 | 0.05 |
| Weston 399 (wt percent) | 0.05 | 0.05 | 0.05 | 0.05 | 0.05 |
| Product Properties | | | | | |
| MI2 (g/10 min) | 0.08 | 0.06 | 0.05 | 0.05 | 0.04 |
| MI5 (g/10 min) | 0.43 | 0.31 | 0.31 | 0.25 | 0.29 |
| MI10 (g/10 min) | 1.73 | 1.39 | 1.34 | 1.37 | 1.38 |
| MI21 (g/10 min) | 9.40 | 9.85 | 9.22 | 9.09 | 8.56 |
| MFR (MI21/MI2) | 116.0 | 179.1 | 192.1 | 171.5 | 237.8 |
| MFR (MI21/MI5) | 21.9 | 31.8 | 29.7 | 36.4 | 29.3 |
| MFR (MI10/MI2) | 21.4 | 25.3 | 28.0 | 25.8 | 38.3 |
| Density (g/cc) ASTM Slow cooled | 0.9495 | 0.9493 | 0.9489 | 0.9483 | 0.9489 |

These resin formulations were then measured to determine shear viscosity measurements (DMS and stress relaxation) that were fitted to a Carreau model, and the results are presented in Table 4. The Carreau model used to fit the viscosity data uses equation (I) below. TA Instrument software Orchestrator (V. 6.5.8) was used for the fitting procedure.

$$\eta(\omega) = C_1(1+(C_2\omega)^{C_3})^{(C_4-1)/C_3}$$ Eqn. (I)

Viscosity, strain at break, and time to break were then determined at different Hencky strain rates, as shown in Table 5. The comparative examples (CE1 to CE5) were not evaluated for low shear viscosity or Hencky strain rates, as the shear viscosity response from 100 sec$^{-1}$ to 0.01 sec$^{-1}$ shear rate and the Rheotens response data showed no changes. No changes indicate that the antioxidant added in the mixer hopper is preventing the oxygen tailoring chemistry and no coupling occurs. the mixer hopper is preventing the oxygen tailoring chemistry and no coupling occurs.

Extensional rheologies for inventive and commercial examples are shown in Tables 5 through 13. Extensional rheology was measured at 170° C. The 'Strain at Break" is equal to the "Hencky Strain Rate" times the "Time to Break."

TABLE 4

| Low Shear Rate Viscosities on IE-1 to IE-5 at Selected Shear Rates* | | | | |
|---|---|---|---|---|
| Inventive Examples | | Viscosity at 10$^{-4}$ sec$^{-1}$ (Pa-s, times 10$^6$) | Viscosity at 10$^2$ sec$^{-1}$ (Pa-s, times 10$^3$) | Viscosity Ratio (viscosity at 10$^{-4}$/ viscosity at 10$^{+2}$) |
| IE1 | 0 percent | 1.49 | 2.04 | 743.5 |
| IE2 | 5 percent | 2.80 | 2.20 | 1272.7 |
| IE3 | 10 percent | 3.54 | 2.12 | 1669.8 |
| IE4 | 15 percent | 4.25 | 2.23 | 1905.8 |
| IE5 | 21 percent | 4.90 | 2.20 | 2232.3 |
| Commercial Resin | FORTIFLEX GA 50-100 | 1.94 | 1.75 | 1108.5 |

*Each viscosity was measured at 190° C.

TABLE 5

| Extensional Rheology at 170° C. | | | |
|---|---|---|---|
| Feedstock Control | Hencky Strain Rate 20 sec$^{-1}$ | Hencky Strain Rate 10 sec$^{-1}$ | Hencky Strain Rate 1 sec$^{-1}$ |
| Viscosity (Pa-s) | 81090 | 12430 | 306000 |
| Time to Break (sec) | 0.13 | 0.31 | 2.71 |
| Strain at Break | 2.6 | 3.1 | 2.71 |

TABLE 6

Extensional Rheology at 170° C.

| IE-1 0 Percent Oxygen | Hencky Strain Rate 20 sec$^{-1}$ | Hencky Strain Rate 10 sec$^{-1}$ | Hencky Strain Rate 1 sec$^{-1}$ |
|---|---|---|---|
| Viscosity (Pa-s) | 76730 | 85470 | 304100 |
| Time to Break (sec) | 0.13 | 0.27 | 3.07 |
| Strain at Break | 2.6 | 2.7 | 3.07 |

TABLE 7

Extensional Rheology at 170° C.

| IE-2 5 Percent Oxygen | Hencky Strain Rate 20 sec$^{-1}$ | Hencky Strain Rate 10 sec$^{-1}$ | Hencky Strain Rate 1 sec$^{-1}$ |
|---|---|---|---|
| Viscosity (Pa-s) | 44930 | 57230 | 29450 |
| Time to Break (sec) | 0.09 | 0.17 | 2.51 |
| Strain at Break | 1.8 | 1.7 | 2.51 |

TABLE 8

Extensional Rheology at 170° C.

| IE-3 10 Percent Oxygen | Hencky Strain Rate 20 sec$^{-1}$ | Hencky Strain Rate 10 sec$^{-1}$ | Hencky Strain Rate 1 sec$^{-1}$ |
|---|---|---|---|
| Viscosity (Pa-s) | 80930 | 117800 | 326100 |
| Time to Break (sec) | 0.14 | 0.3 | 2.49 |
| Strain at Break | 2.8 | 3 | 2.49 |

TABLE 9

Extensional Rheology at 170° C.

| IE-4 15 Percent Oxygen | Hencky Strain Rate 20 sec$^{-1}$ | Hencky Strain Rate 10 sec$^{-1}$ | Hencky Strain Rate 1 sec$^{-1}$ |
|---|---|---|---|
| Viscosity (Pa-s) | 50630 | 63890 | 223900 |
| Time to Break (sec) | 0.09 | 0.17 | 2.25 |
| Strain at Break | 1.8 | 1.7 | 2.25 |

TABLE 10

Extensional Rheology at 170° C.

| IE-5 21 Percent Oxygen | Hencky Strain Rate 20 sec$^{-1}$ | Hencky Strain Rate 10 sec$^{-1}$ | Hencky Strain Rate 1 sec$^{-1}$ |
|---|---|---|---|
| Viscosity (Pa-s) | 83690 | 70350 | 353100 |
| Time to Break (sec) | 0.14 | 0.2 | 2.97 |
| Strain at Break | 2.8 | 2 | 2.97 |

TABLE 11

Extensional Rheology at 170° C.

| SOLVAY FORTIFLEX GA 50-100 | Hencky Strain Rate 20 sec$^{-1}$ | Hencky Strain Rate 10 sec$^{-1}$ | Hencky Strain Rate 1 sec$^{-1}$ |
|---|---|---|---|
| Viscosity (Pa-s) | 29700 | 76730 | 225800 |
| Time to Break (sec) | 0.07 | 0.2 | 1.89 |
| Strain at Break | 1.4 | 2 | 1.89 |

TABLE 12

Extensional Rheology at 170° C.

| MARLEX HXM 50-100 | Hencky Strain Rate 20 sec$^{-1}$ | Hencky Strain Rate 10 sec$^{-1}$ | Hencky Strain Rate 1 sec$^{-1}$ |
|---|---|---|---|
| Viscosity (Pa-s) | 29050 | 38570 | 87630 |
| Time to Break (sec) | 0.08 | 0.16 | 1.03 |
| Strain at Break | 1.6 | 1.6 | 1.03 |

TABLE 13

Extensional Rheology at 170° C.

| DGDA-5110 | Hencky Strain Rate 20 sec$^{-1}$ | Hencky Strain Rate 10 sec$^{-1}$ | Hencky Strain Rate 1 sec$^{-1}$ |
|---|---|---|---|
| Viscosity (Pa-s) | 50700 | 58660 | 137100 |
| Time to Break (sec) | 0.1 | 0.17 | 1.35 |
| Strain at Break | 2 | 1.7 | 1.35 |

Figure 2:
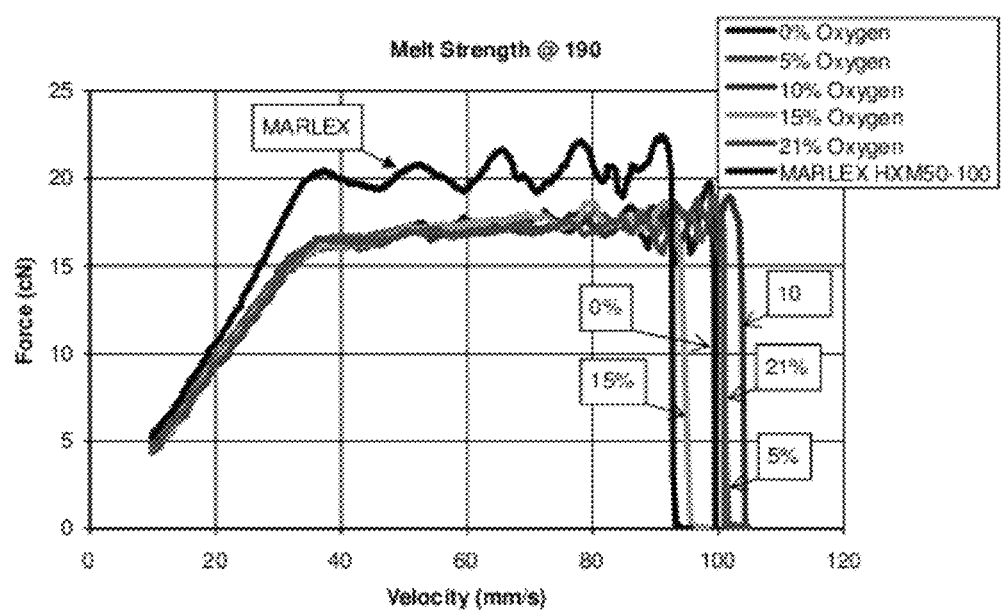
FIG. 2 is a plot showing melt strength for Examples CE1 to CE5 along with a commercially available material.
Figure 3:
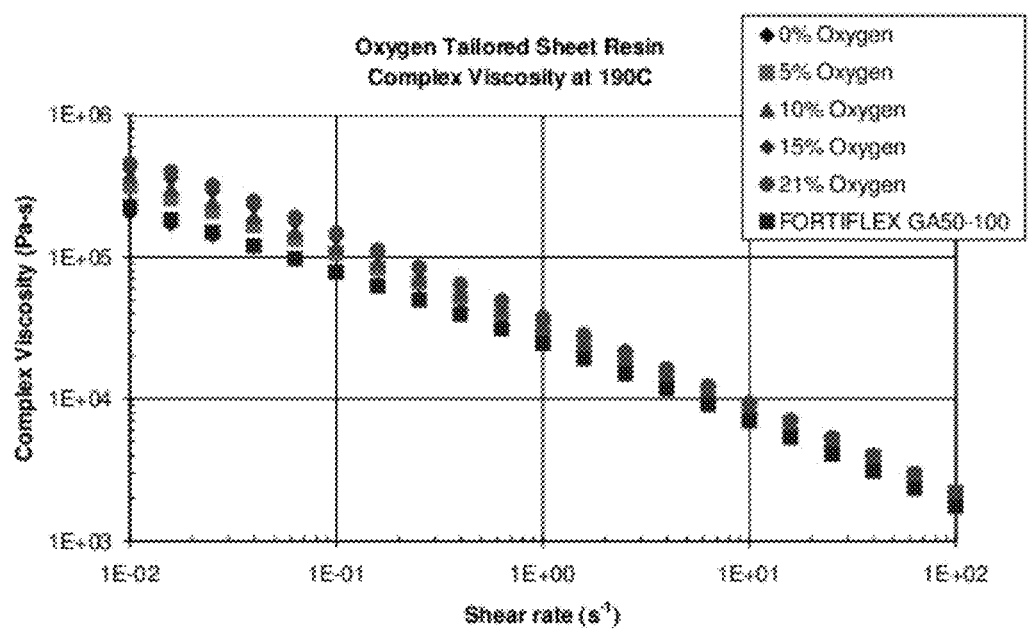
FIG. 3 is a plot showing shear viscosity for Examples IE1 to IE5 along with a commercially available material.
Figure 4:
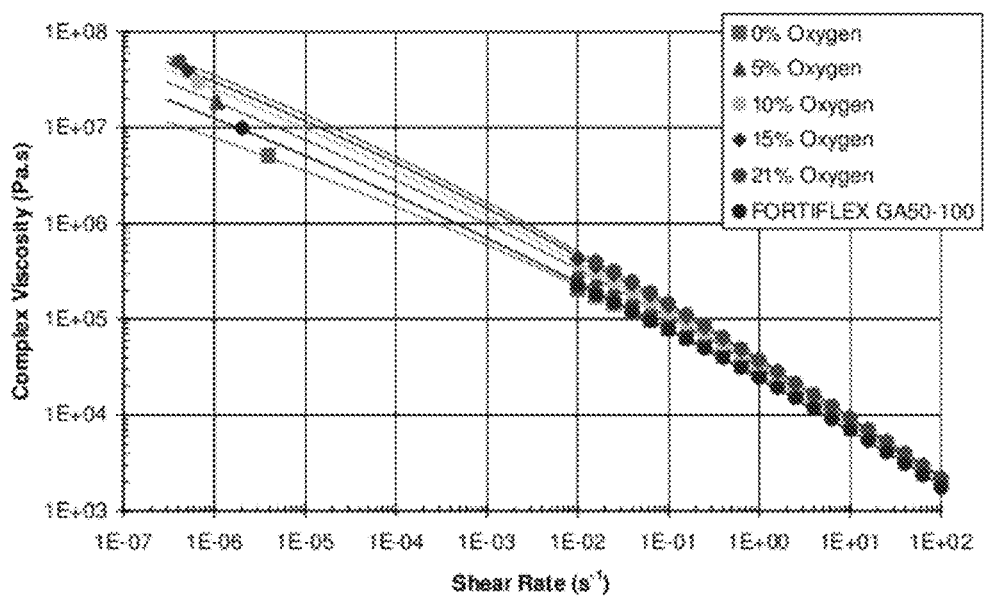
FIG. 4 is a plot showing low shear viscosity for Examples IE1 to IE5 along with a commercially available material.
Figure 5:
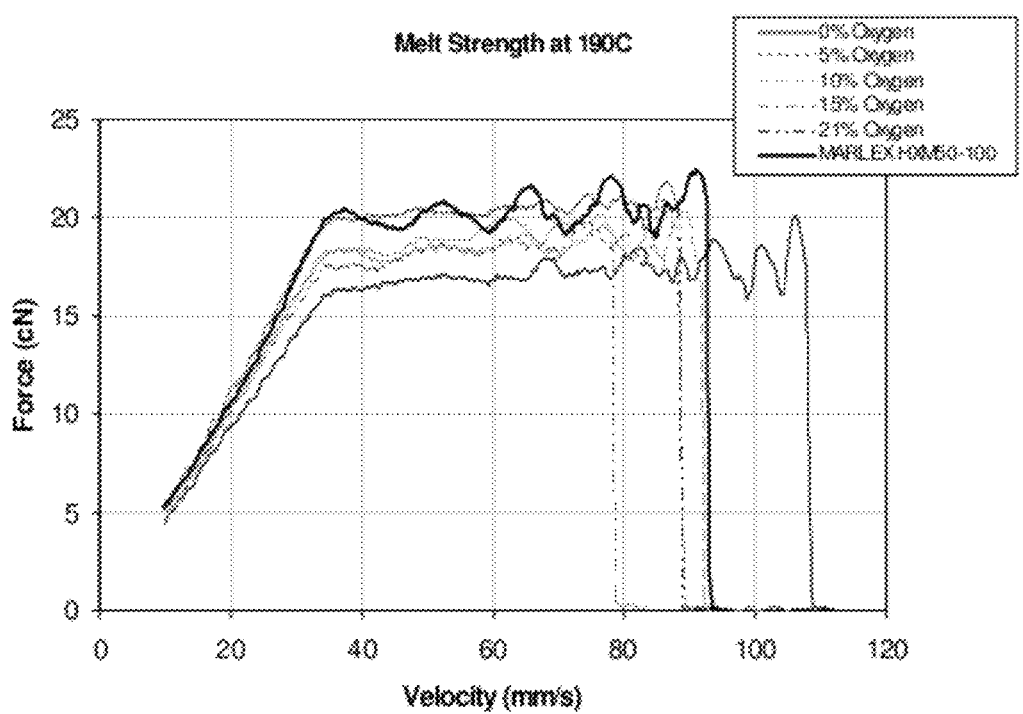
FIG. 5 is a plot showing melt strength for Examples IE1 to IE5 along with a commercially available material.

Inventive examples clearly show that as the oxygen level increases, the coupling effect is more pronounced. As the oxygen level increases, the low shear rate viscosity is increased, the ratio of the low shear rate viscosity at $10^4$ sec$^{-1}$ to the shear rate viscosity at 100 sec$^{-1}$ is increased, and the Rheotens melt strength plots show an increase in the force as measured in cN (see FIGS. 2 and 5). But the Hencky strain (sec$^{-1}$), which is a measure related to extensional flows, indicates only slight changes. In fact, the IE5 example (21 percent O$_2$) shows little or no change from the unmodified resin. Thus, the inventive examples show improvements in shear flows or sag and drape resistance, while retaining the excellent extensional flow of the starting resin, which is the same starting resin as the commercial sample DGDA 5110. For a typical thermoforming operation, the draw (Engineering strain) is 200 percent to 400 percent. According to the correspondence between Hencky and Engineering strain shown below, in Table 14, materials with strains at break above 1.7 to 1.8 (447 percent to 500 percent) should perform well, especially if they reach this strain at break at the highest strain rate.

TABLE 14

| Hencky strain | | | | | | | | | |
|---|---|---|---|---|---|---|---|---|---|
| 0 | 0.5 | 1 | 1.4 | 1.7 | 1.8 | 2 | 2.5 | 3 | 3.5 |
| Eng. strain 0% | 65% | 172% | 306% | 447% | 505% | 639% | 1118% | 1909% | 3212% |

Further, the samples have improved shear flow and extensional flows compared to the two commercial samples purchased in the marketplace. These examples thus clearly show the objective of this invention of improved shear and extensional flow combinations. This novel and unexpected combination is also improved over the commercial resins gathered from the marketplace.

Thermoforming experiments were undertaken to verify these findings in an end-use application.

Thermoforming Evaluation Results:

Sheet samples prepared from DGDA 5110, MARLEX HXM 50-100 and IE5 oxygen tailored resin (oxygen tailored at 21 percent oxygen) were each extruded into sheets with the following dimensions: 24 inch (610 mm) wide, 36 inch (914 mm) long, and 0.120 inch (3.05 mm) thick. The sheet samples were prepared on a conventional sheet extrusion line using a 2.5 inch (63.5 mm) diameter extruder with a length to diameter ratio of 30:1, and a 2-stage double wave style screw to plasticate the resin. A 26 inch (660 mm) wide extrusion die was used to form the extrudate into a molten sheet, and a horizontal 3 roll stand was used to size and cool the sheet. The sheet samples were subsequently thermoformed on a ZMD International Model V223 shuttle thermoformer.

Each sheet was placed in the clamp frame of the ZDM thermoformer, and rigidly clamped on all four sides. Next, the clamped sheet was indexed into the heat station of the ZMD thermoformer, where the sheet was heated by quartz infrared radiant heaters. The sheet is heated for a period of 150 seconds by absorption of infrared radiation from heaters in the oven of the thermoformer. The sheet surface temperature was measured at the end of the 150 seconds, and reported in Table 15 below. As the temperature of the sheet increased, the sheet began to sag below the clamp frame. The distance of the sheet sag from the clamp frame was measured using an infrared profiling scanner (light curtain) that was positioned to detect sheet sag at the middle of the oven. The value of the sheet sag was recorded at the end of the heating cycle (150 sec), and before the clamped frame was indexed out of the oven, and into the form station. The sheet surface temperature on the bottom side of the sheet was measured at the end of the heat cycle using an infrared pyrometer.

Figure 6:
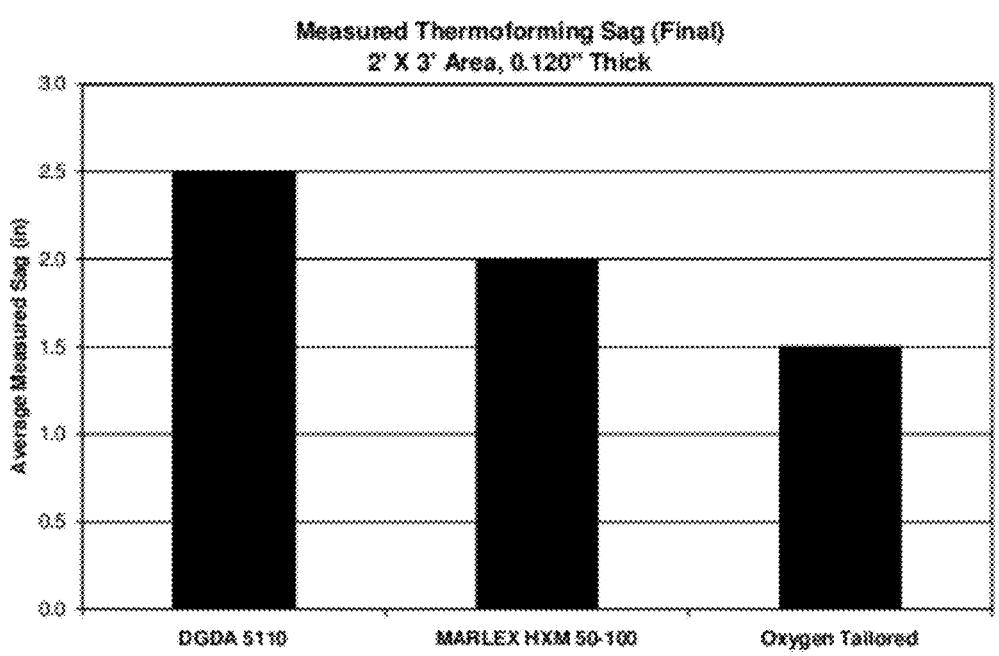
FIG. 6 depicts measured thermoforming sag of sheets made in accordance with the invention as well as comparative sheets.

The sag or drape results for sheets heated for 150 seconds in the oven are shown in the Table 15 below and in FIG. 6. The oxygen tailored sample has less sag than the other samples, therefore the distance from the bottom sheet surface to the bottom oven heaters is less, and the surface temperature is about the same or within the error of the test measurement on the sample exhibiting the less sag. The desired result is no more than 2.0 inch (50.8 mm) sag, more preferable it less than 1.8 inch (45.7 mm) sag, and even more preferable if less than 1.7 inch (43.2 mm) sag, and most preferable is less than, or equal to, 1.5 inch (38.1 mm) sag.

TABLE 15

Sheet Sag Results

|  | DGDA 5110 | MARLEX HXM 50-100 | IE5 Oxygen Tailored (21 Percent Oxygen) |
|---|---|---|---|
| Average Measured Sag, inch (cm) | 2.5 (6.4) | 2.0 (5.1) | 1.5 (3.8) |
| Average Measured Surface Temperature (° C.) | 175 | 172 | 169 |

What is claimed is:

1. A process for making an extruded sheet comprising:
   a) conveying a HDPE resin through an extruder, wherein the extruder comprises a feed zone, a first melt zone downstream of the feed zone, a second melt zone downstream of the first melt zone, and a third melt zone downstream of the second melt zone;
   b) contacting the resin with a gaseous medium comprising oxygen in the second melt zone, under conditions sufficient to promote at least some long chain branching thereby producing a tailored HDPE; and wherein the HDPE resin used in step a) was polymerized using a catalyst comprising chromium;
   c) adding an antioxidant(s) to the tailored HDPE in the third melt zone;
   d) passing the resin resulting from step (c) through a die to form a sheet having a thickness in the range of 0.25 mm to 25 mm; and
   wherein the tailored HDPE has a low shear-rate viscosity, measured at 190° C. and 0.01 sec$^{-1}$, that is from 50 percent to 340 percent higher than the low shear-rate viscosity, measured at 190° C. and 0.01 sec$^{-1}$, of the non-tailored HDPE.

2. The process of claim 1, wherein the resin resulting from step (c) is characterized as having at least a 17 percent increase in melt strength over the unmodified HDPE resin as determined by Rheotens at 190° C.

3. The process of claim 2, wherein the oxygen in the second melt zone is present in an amount from 5 percent to 21 percent of the gaseous medium.

4. The process of claim 2, wherein the oxygen in the second melt zone is present in an amount from 10 percent to 21 percent of the gaseous medium.

5. The process of claim 2, wherein the oxygen in the second melt zone is present in an amount from 18 percent to 21 percent of the gaseous medium.

6. The process of claim 1, wherein the temperature in the second melt zone is in the range of from 150° C. to 280° C.

7. The process of claim 1, wherein the resin is first formed into pellets then re-melted in order to form the sheet.

8. The process of claim 1, wherein the antioxidant is a primary antioxidant, and wherein the process further comprises adding a secondary antioxidant to the tailored HDPE at a point downstream of the second melt zone.

9. The process of claim 8, wherein the secondary antioxidant is a phosphite antioxidant, and is added in an amount from 100 ppm to 1500 ppm.

10. The process of claim 1, wherein the sheet is characterized as having a sag after heating, via infrared absorption for a period of 150 seconds, of less than 2.0 inch (50.8 mm), as measured by a light curtain when the sheet has the dimensions of 24 inch (610 mm) by 36 inch (914 mm) by 0.120 inch (3.05 mm) thick.

11. The process of claim 10, wherein the sheet is further characterized as having a sag less than 1.8 inch (45.7 mm) as measured by a light curtain.

12. The process of claim 11, wherein the HDPE resin used in step a) has a melt index, as determined by I21, from 8 g/10 min to 14 g/10 min.

13. The process of claim 10, wherein the sheet is further characterized as having a sag less than 1.7 inch (43.2 mm) as measured by a light curtain.

14. The process of claim 10, wherein the HDPE resin used in step a) has a density in the range from 0.947 g/cc to 0.953 g/cc.

15. The process of claim 1, wherein the HDPE resin used in step a) has a density in the range from 0.940 g/cc to 0.955 g/cc.

16. The process of claim 15, wherein the HDPE resin used in step a) has an I21/I2 in the range of from 90 to 240.

17. The process of claim 1, wherein the HDPE resin used in step a) has a melt index, as determined by I21, from 5 g/10 min to 20 g/10 min.

18. The process of claim 1, wherein the HDPE resin used in step a) has an I21/I2 in the range of from 75 to 200.

19. The process of claim 1, wherein the HDPE resin used in step a) is a copolymer comprising ethylene and an alpha olefin having from 3 to 10 carbon atoms.

20. The process of claim 19, where the alpha olefin is 1-hexene.

21. The process of claim 1, wherein the antioxidant is a phenolic antioxidant, and is added in an amount from 100 ppm to 1500 ppm.

22. The process of claim 1, wherein the HDPE resin used in step (a) was polymerized from a Ti modified CrO catalyst in a gas phase reactor, where the catalyst activation temperature was from 400° C. to 1000° C.

23. The process of claim 22, wherein the catalyst activation temperature was from 400° C. to 600° C.

24. The process of claim 22, wherein the catalyst activation temperature was from 601° C. to 750° C.

25. The process of claim 22, wherein the catalyst activation temperature was from 751° C. to 1000° C.

26. The process of claim 22, further characterized in that the polymerization temperature was from 95° C. to 100° C.

27. The process of claim 26, wherein the polymerization temperature was less than, or equal to, 95° C.

28. The process of claim 26, wherein the polymerization temperature was less than, or equal to, 90° C.

29. The process of claim 26, wherein the polymerization temperature was less than, or equal to, 85° C.

30. The process of claim 1, wherein at least one polyethylene glycol is added to the tailored HDPE in step c).

* * * * *